United States Patent [19]

Orr

[11] 3,757,815
[45] Sept. 11, 1973

[54] PRESSURE RELIEF VALVE
[76] Inventor: James D. Orr, 6330 E. Surrey, Birmingham, Mich. 48010
[22] Filed: Feb. 10, 1972
[21] Appl. No.: 225,140

[52] U.S. Cl............ 137/475, 137/476, 137/478, 137/495
[51] Int. Cl............................................ F16k 17/04
[58] Field of Search................. 137/469, 474, 475, 137/476, 477, 478, 495; 92/103

[56] References Cited
UNITED STATES PATENTS

| | | | |
|---|---|---|---|
| 3,027,912 | 4/1962 | Carr | 137/478 |
| 1,696,452 | 12/1928 | Raymond | 137/477 |
| 2,151,501 | 3/1939 | Corcoran | 137/469 X |
| 2,490,219 | 12/1949 | Kniecik | 137/474 |
| 2,880,751 | 4/1959 | Tobis | 137/478 |
| 2,849,026 | 8/1958 | Taplin | 92/103 |
| 3,411,530 | 11/1968 | Powell | 137/475 |
| 3,589,386 | 6/1971 | Chapman | 137/469 X |

Primary Examiner—Harold W. Weakley
Attorney—David A. Maxon

[57] ABSTRACT

A pressure relief valve has a single piece outer body or housing with an inlet and an outlet formed therein communicating with a chamber formed internally of the housing; a moveable valving member situated within the chamber is generally contained within a removable valve guide and is resiliently urged toward a closed position against the inlet by a spring also contained within the valve guide; and a manually actuated lever is operatively connected to the valving member through a valve stem member which is connected to the valving member in a manner providing for a lost motion connection therebetween.

8 Claims, 7 Drawing Figures

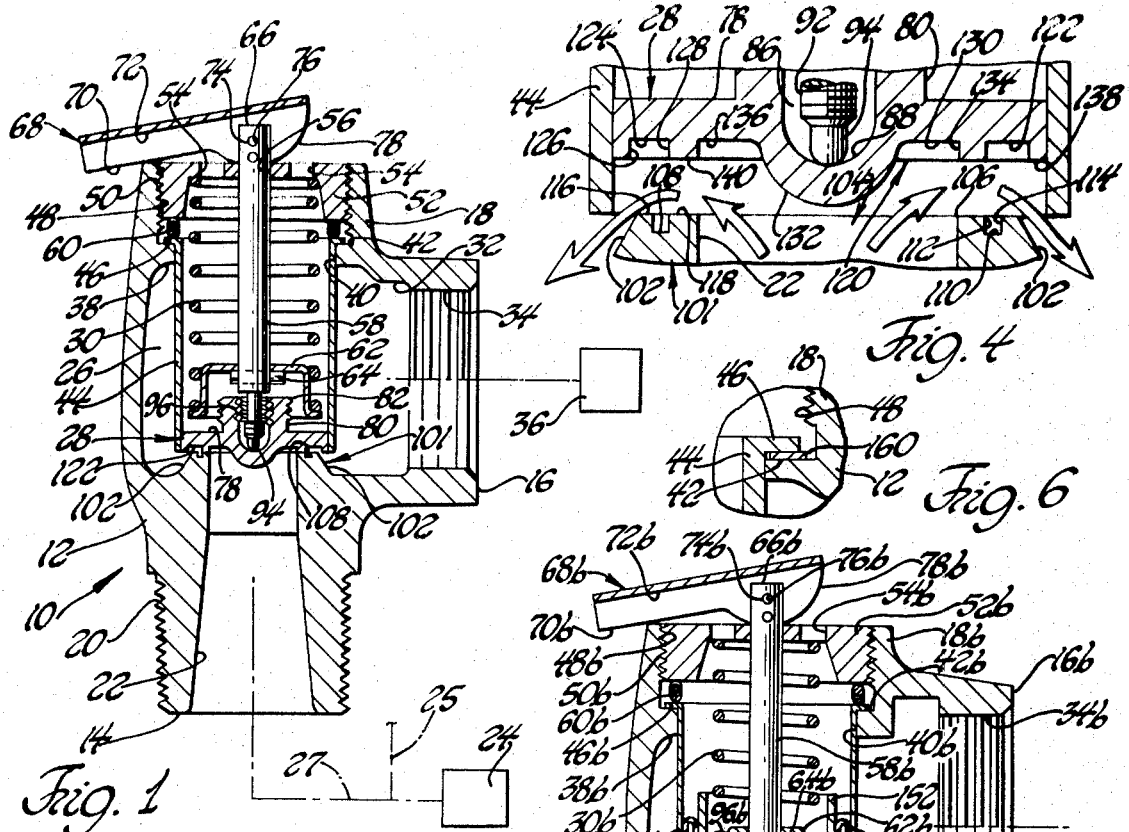
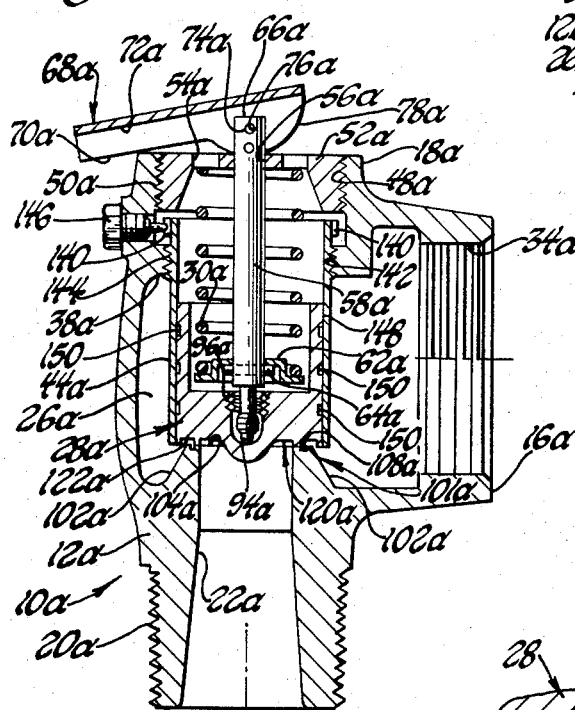
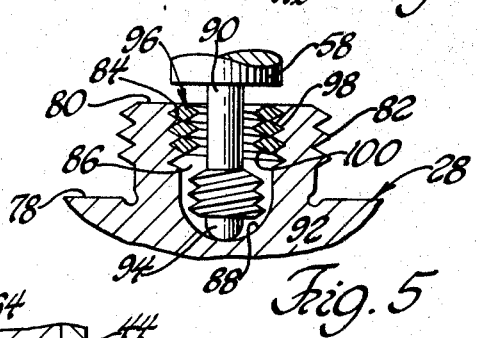
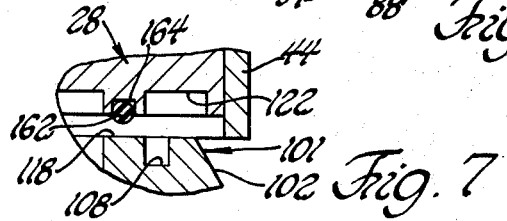

PRESSURE RELIEF VALVE

BACKGROUND OF THE INVENTION

Various forms of pressure relief valve assemblies have heretofore been proposed by the prior art. However, such prior art valve assemblies, although usually found generally acceptable in their operation, have, nevertheless, been of a configuration requiring additional manufacturing operations as well as generally costly machining operations. Further, heretofore, the prior art valves, in order to permit assembly of the various elements comprising such assemblies, required that the outer valve housings be made in at least two pieces which, in turn, had to be secured to each other during final assembly.

Accordingly the invention as herein disclosed and claimed is primarily directed to the solution of the above as well as other related problems and disadvantages of the prior art.

SUMMARY OF THE INVENTION

According to the invention, a fluid pressure relief valve assembly comprises a valve body, inlet means adapted for communication with a related source of pressurized fluid, a chamber formed within said valve body adapted to be at times placed in communication with said inlet means, outlet means formed in said valve body and communicating with said chamber, said inlet means including discharge orifice means leading to said chamber, resilient means biasing valving means adapted to be effective for closing said discharge orifice means, said valving means comprising a valving member having a valving surface generally juxtaposed to said discharge orifice means, said valving surface including a contoured deflecting surface portion progressively increasingly exposed to said pressurized fluid within said inlet means as said valving member is progressively moved away from said discharge orifice means, said contoured deflecting surface portion being effective upon so being moved away from said discharge orifice means to deflect and change the path of travel of said pressurized fluid flowing from said inlet means and into said chamber thereby causing said valving member to experience a reaction force in opposition to the force of said resilient means tending to bias said valving member closed against said discharge orifice means, and valve guide means separate from said valve body for operatively engaging and guiding said valving as said valving member moves with respect to said discharge orifice means.

Various general and specific objects and advantages of the invention will become apparent when reference is made to the following detailed description of the invention considered in conjunction with the accompanying drawings.

DESCRIPTION OF THE DRAWINGS

In the drawings, wherein for purposes of clarity certain elements and/or details may be omitted from one or more views;

FIG. 1 is a generally longitudinal or axial cross-sectional view of a valve assembly constructed in accordance with the teachings of the invention;

FIG. 2 is a view similar to that of FIG. 1 but illustrating a second embodiment of the invention;

FIG. 3 is a view similar to that of FIG. 1 but illustrating a third embodiment of the invention;

FIG. 4 is an enlarged view of a fragmentary portion of the structure of FIG. 1;

FIG. 5 is an enlarged view of a different fragmentary portion of the structure of FIG. 1;

FIG. 6 is a fragmentary portion of a modification of the invention; and

FIG. 7 is a fragmentary portion of still another modification of the invention.

DESCRIPTION OF THE PREFERRED EMBODIMENTS

Referring now in greater detail to the drawings, FIG. 1 illustrates a valve assembly 10 having a main outer body or housing 12 with integrally formed projecting body portions 14, 16 and 18. Body portion 14 is preferably externally threaded, as at 20, and has a conduit or nozzle section 22 formed therein. One end of conduit 22 is adapted for communication with a related source 24 of pressurized fluid (such as, for example, a steam boiler or generator) while the other end of conduit 22, formed to be open, is adapted for communication with a main chamber 26 formed within housing 12. The degree of communication experienced between conduit 22 and chamber 26 is determined by a moveable valving member 28 normally resiliently urged to a closed position (as shown in FIG. 1) by suitable cooperating resilient means such as a coiled compression spring 30.

Body portion 16 has a conduit 32 formed therethrough including a preferably internally threaded portion 34. The inner end of conduit 32 is in continual communcation with chamber 26 while the other end of conduit 32 is adapted and intended for communication with a related area 36 of relatively low pressure.

Formed internally of housing 12 is a generally radially inwardly directed flange-like portion 38 defining a generally cylindrical aperture 40 along with an annular seating surface 42. A removable but preferably tightly engaging generally tubular guide member 44 is received through aperture 40 in a manner as to have an integrally formed generally radially outwardly radiating flange portion 46 abutingly engaging the abutment surface 42.

Body portion 18 is provided with an internally threaded section 48 which threadably engages an externally threaded portion 50 of a capping-like end member 52. As illustrated, the end member 52 may be provided with a plurality of conduit portions 54 formed therethrough for communication with, for example, the ambient atmosphere, and an additional clearance type passageway 56 for the passage therethrough of a generally cylindrical valve stem 58. As can be seen a generally annular spring 60 of wavy-like configuration is contained generally between the inner end of plug member 52 and flange 46 of valve guide 44. In threading capping member 52 inwardly, the end member 52 tends to further compress the wave portions of the spring 60 and in so doing applies a resilient force against flange 46 thereby holding it against the abutment or seating surface 42.

One end of compression spring 30 is seated against end capping member 52 while the other end of spring 30 is seated against a moveable spring seat or perch 62, which may be of a generally inverted cup-shaped configuration, received generally about the stem 58 but prevented from downward movement relative to stem 58 as by an abutment in the form of a cross-pin 64 received in a cooperating aperture formed through the valve stem 58. As should be apparent, the more end member 52 is threaded inwardly of housing portion 18 the more will spring 30 undergo compression and therefore the greater will be the resilient force against valve member 28 tending to hold valve member 28 closed against inlet conduit 22.

The lower end of valve stem 58 is operatively connected to valve member 28 in a manner to be hereinafter more fully described, while the upper end 66 is operatively pivotally connected to a manually actuated lever 68. Lever 68, when viewed in transverse cross-section, may be of a configuration including parallel downwardly depending wall portions, one of which is shown at 70, which are joined as by a longitudinally extending bight portion 72. The upper end 66 of stem 58 may, in turn, be positioned between such parallel wall portions (typically illustrated at 70) and pivotally connected thereto as by a pivot pin 74 operatively engaging opposed parallel wall portions of lever 68 and passing through a receiving passageway 76 formed in stem 58. Each of the lever wall portions is preferably provided with a cam surface, typically illustrated at 78, which is held in engagement with the outer surface of end cap member 52. The cam surface 78 is, of course, functionally eccentric with respect to privot pin 74. Therefore, as lever 68 is rotated generally clockwise about the axis of pivot pin 74, stem 58 is correspondingly moved upwardly thereby lifting valve member 28 against the resilient resistance of spring 30 and manually completing communication between chamber 26 and inlet conduit 22.

FIG. 5, an enlarged fragmentary portion of FIG. 1, better illustrates the means and manner for operatively connecting the lower end of stem 58 to the valve member 28. In considering each of FIGS. 1, 4 and 5, it can be seen that valving member 28 comprises a disc-like main body 78 having an integrally formed generally cylindrical up-standing body portion 80 which is externally threaded as at 82 and internally threaded as at 84. A chamber like opening or recess 86 extends further into the valving member 28 and may preferably terminate as in a generally spherical end surface 88.

The valve stem 58 is provided with a necked-down extension 90 which carries, near the end thereof, an externally threaded portion 92. The extension 90 may ultimately terminate in an abutment surface such as a generally spherical end surface 94.

As best seen in FIG. 5, an insert 96, commonly referred to as a heli-coil insert, is threadably engaged within the internally threaded portion 84 of valving member 28. A heli-coil may be described as a generally cylindrically extending helical body having an externally formed thread configuration, as at 98, formed thereon and an internally formed thread configuration, as at 100, also formed thereon. Such heli-coil inserts are, for example, typically illustrated in the Heli-Coil Corporation catalog Bulletin 900, copyrighted by the Heli-Coil Corporation in 1970.

The internally threaded portion 84 and heli-coil insert 96 are selected of such dimensions as to enable the externally threaded portion 92 of stem 58 to be threadably engageable with the interior thread formation 100 of insert 96. Accordingly, the stem 58 may rotate causing threaded portion 92 to threadably engage and ultimately pass through the heli-coil insert 96 assuming a position as generally depicted in any of FIGS. 1, 2, 3 or 5 wherein the threaded portion 92 is generally loosely confined within chamber 86 but prevented from withdrawal therefrom by virtue of the heli-coil insert 96. This, in effect, defines a lost motion connecting means as between the stem 58 and valving member 28.

For sake of clarity, the heli-coil inserts in FIGS. 1, 2 and 3 are shown in cross-section but are purposely not cross-hatched.

Referring now in greater detail to FIGS. 1 and 4, it can be seen that the interior of valve housing 12 is formed as to define a generally frusto-conical portion having a generally tapered outer surface 102 which terminates, at its upper end, in a generally transverse planar surface 104. The planar surface 104 is interrupted by an orifice 106 defining the discharge orifice of conduit 22 and an annular recess or groove 108 which includes an annular end surface 110 and opposed circular wall surfaces 112 and 114. The groove 108, in effect, defines annular lands or surfaces 116 and 118 on radially opposite sides thereof.

The valving member 28 is preferably provided with a downwardly directed valving surface 120 which has formed therein a first annular groove or recess 122 comprised generally of an annular end surface 124 and opposed circular walls 126 and 128. A second annular groove 130 is defined as by a centrally positioned downwardly depending generally spherical protuberance or extension 132 and a circular wall 134 joined to the base of the extension 132 as by an annular end surface 136. As can be seen, annular groove 122 and 130 also serve to define annular lands or surfaces 138 and 140.

In FIG. 4, the valving member 28 is shown in an opened position (with the degree of actual opening possibly being to some degree exaggerated in order to more clearly illustrate the various elements and details thereof. However, as shown in FIG. 1, when the valving member 28 is in its closed position, ideally annular surface 140 of valving member 28 is juxtaposed to and held in abutting engagement with annular surface 118 of the frusto-conical portion 101 in a manner whereby circular wall 134 forms a continuous extension of discharge orifice 106 and whereby circular wall surfaces 128 and 138 define a continuous cylindrical surface. At this time, as is also best seen in FIG. 1, annular land surface 116 is disposed as to be generally opposed to recess 122 and situated as to be radially between circular walls 126 and 128.

OPERATION

Let it be assumed that apparatus 24 is a steam generator supplying steam to some related consuming device as via conduit means 25 and that the valve assembly 10 is operatively connected thereto as by conduit means 27.

The pre-load force of spring 30 serves to hold valving member 28 closed against the discharge orifice 106 thereby precluding the flow of such pressurized fluid through inlet conduit means 22 and into chamber 26. The valving member continues to be held in its closed position until such time as the pressure of the steam in conduit 22 increases to such a magnitude resulting in a pressure differential across the valving member 28 sufficient to overcome the pre-load force of spring 30. When the pressure of such pressurized fluid attains such a magnitude, valving member 28 starts to move upwardly and away from the discharge orifice 106. The instant that valving member 28 so starts to move, the pressurized fluid starts to pass between the very slight space between juxtaposed lands or surfaces 118 and 140. As the pressurized fluid continues its generally radially outward travel, its otherwise smooth flow is somewhat interrupted by the lower annular groove 108 and upper annular groove 122, also an annular nozzle is formed between surfaces 116 and 124 providing a throttling on the escape of fluids. The effect of such grooves 108 and 122 is to create a degree of turbulence in the flow of the escaping pressurized fluid as well as to in effect reduce the velocity of flow of fluid relative to the radial extent of the surfaces 104 and 120. These grooves cooperate to form a restriction creating pressure on a larger area of disc 28. This is achieved by nozzle throttling through an annular area creating statis pressure over disc 28. Both of such effects result in an increase in the magnitude of the static pressure of the fluid against the valving member 28 as well as exposing a greater effective area of the lower surface 120, of valving member 28, to be acted against by such pressurized fluid.

Consequently, as soon as the pre-load of spring 30 is exceeded, valve member 28 starts to move upwardly; and as soon as valve member 28 starts to move upwardly the effective area of the valve member 28 is increased as well as the magnitude of the static pressure of the fluid flowing past valve 28 thereby creating an increased reaction force against valve 28 moving the valve 28 still further away from the discharge orifice 106.

As valving member 28 so continues to move upwardly it attains a position as generally depicted in FIG. 4 at which time the force of the further compressed spring 30 is balanced by the force of the pressurized fluid the path of which is generally depicted by the broad arrows. As can be seen, the escaping pressurized fluid is caused to effectively strike the lower valving surface 120 and then change direction and flow downwardly through the annular space defined between the lower open end of the valve guide 44 and the tapered surface 102 of the frusto-conical portion 101. The energy expended in causing the escaping pressurized fluid to reverse its direction is realized as a reaction force against the lower surface 120 to first raise higher and then tending to hold the valve member 28 open.

The cracking pressure (that pressure at which valve 28 starts to move upwardly away from the discharge orifice 106) may be readily adjusted by means of the cap-member or adjusting nut 52. That is, in order to assure closure of valve 28 until some higher magnitude of pressure is attained by the pressurized fluid, all that needs to be done is to threadably rotate the nut 52 inwardly thereby further compressing spring 30 and correspondingly increasing the pre-load force of spring 30 on valve 28. The converse is, of course, also true. The wave spring 60 is capable of sufficient deflection to enable a considerable degree of travel of nut 52 and still maintain guide flange 46 seated against abutment surface 40.

Substantial differences in order of magnitude of desired thresholds of pressure for actuating the opening of the valve and for subsequent blowdown of the valve can be achieved by selecting springs 30 to have appropriate size and spring constant to exert the appropriate order of magnitude of force on the valve member 28. In the immediately aforementioned embodiment of the invention, where thresholds of pressure for actuation or blowdown do not vary substantially, only one such spring 30 having a specified spring rate and size need be used. However, in the second and third embodiments of the invention, to be discussed more fully hereinafter, different size springs have different spring constants for the spring member 30 are recommended upon specification of the threshold of pressure for actuation and blowdown of the valve.

SECOND EMBODIMENT OF THE INVENTION

FIG. 2 illustrates a second embodiment of the invention. All elements in FIG. 2 which are like or similar to those of FIGS. 1, 4 and 5 are identified with like reference numerals with a suffix a.

In the valve assembly 10a, the generally transverse wall portion 38a is provided with an internally threaded aperture 142 which threadably engagees an externally threaded portion 144 carried by the tubular valve member guide 44a. The upper end of guide 44a is provided with a plurality of circumferentially arranged recesses or flated portions 140 which, as illustrated, coact with an end 143 of a locking screw 146 threadably carried by housing 12a. The purpose of the threaded portions 142 and 144 is to enable relative rotation and axial movement of guide 44a in order to selectively position the lower open end of guide 44a in a desired relationship to the frusto-conical portion 101a.

The valve member guide 44a is thus axially adjustable and thus operable to control the pressure threshold at which the valve closes again. Thus, a vernier-like precision axial setting of the guide is achieved which permits a vernier-like precision adjustment of the valve blowdown pressure threshold.

The valving member 28a is preferably provided with an elongated cylindrical skirt portion 148 and a plurality of circumferentially extending grooves 150 axially spaced from each other. The purpose of such an elongated skirt 148 as well as the grooves 150 is to minimize pressure leakage between the valve 28a and the guide 44a. That is the elongated body provides for a closer physical relationship between the outer diameter of the valve 28a and the inner diameter of the guide 44a while the grooves 150 serve, in effect, as air pressure traps enabling any pressurized fluid, which may leak between the valve and guide, to undergo a reduction in the velocity of such leakage flow as it successively reaches each of such spaced grooves 150.

The means and manner for securing the lower end of stem 58a to the valving member 28a is the same as that disclosed in FIG. 5 while the configurations, grooves and surfaces of transverse surface 104a and the valving surface 120a are respectively like those of 104 and 120 of FIG. 4.

The operation of valve assembly 10a is like that as described in detail with reference to FIGS. 1, 4 and 5.

THIRD EMBODIMENT OF THE INVENTION

FIG. 3 illustrates a third embodiment of the invention. All elements in FIG. 3 which are like or similar to either FIGS. 1, 2, 3, or 5 are identified with like reference numerals provided with a suffix b.

In the embodiment of FIG. 3, a generally cup-shaped member 152 has a centrally situated axially extending internally threaded portion 154 engaging the outer threaded portion 82b of the valving member 28b. The cup member 152 is tightly threaded as to securely contain, between itself and the upper surface of valving member 28a, an inner peripheral portion of a rolling diaphragm 156 which has its other end secured to the outer cylindrical surface of tubular valve guide 44b. Any suitable means such as a ring-like band 158 generally press-fitted over the outer end of the diaphragm 156 may be employed for anchoring the diaphragm to the guide 44b. In one successful embodiment of the invention, the diaphragm 156 was comprised of a Buna "N" reinforced nylon such as that marketed under the tradename "Bellofram," sold by the Bellofram Corporation and disclosed in U.S. Pat. No. 2,849,026.

The primary purpose of providing such a diaphragm 156 is to define a positive seal in order to prevent the leakage of liquid fluids past the valving member and into the upper interior of valve guide 44a. This becomes of special importance where the valve assembly is to be in combination with, for example, water heaters or hot water pressure vessels.

The means and manner for securing the lower end of stem 58b to the valving member 28b is the same as disclosed in FIG. 5 while the configurations, grooves and surfaces of transverse surface 104b and the valving surface 120b are respectively like those of 104 and 120 of FIG. 4.

The operation of valve assembly 10b is like that as disclosed in detail with reference to FIGS. 1, 4 and 5 except that as the valving member 28b moves upwardly or downwardly the intermediate body portion of the diaphragm rolls upwardly or downwardly generally upon itself thereby continually effecting a positive seal as between the valve guide 44b and valving member 28b.

CONCLUSION

It should be apparent that the invention as herein disclosed provides a multitude of important benefits and improvements over the prior art.

For example, with the invention it is possible to make the outer valve housing as a one piece structure. Although the invention is not so limited, nevertheless, the outer valve housings may be cast of any suitable material such as bronze and later machined as required. Also, it is contemplated that one standard configuration of such outer valve housing could be cast which would be employable in either of the three embodiments disclosed. For example, it would be possible to cast such an outer housing to meet the requirements of housing 12a and then, depending on how the housing were to be employed, drill and tap for screw 146 (or leave blank) and either drill and tap threads 142 (FIG. 2) or drill and ream the aperture 40 (FIG. 1).

In various successful embodiments of the invention, the valve guide, such as at 44, was made of brass. However, other suitable materials may, of course, be employed. All of the valve guides are a distinct improvement over the prior art in many ways. For example, each is easily removed as by withdrawal through the threaded aperture containing the nut 52, 52a or 52b. Further, each of such valve guides is axially adjustable with respect to, for example, the tapered surface 102, 102a or 102b. In the embodiment of FIGS. 1 and 3, such axial adjustment may be easily achieved as by the placement of a suitable shim 160 between the valve guide flange and the abutment surface as typically illustrated in FIG. 6. Such a feature of axial adjustability is important because the proximity of the open end of the valve guide to the tapered surface 102 will determine both the angle of deflection of the escaping pressurized fluid as well as the effective flow are therebetween. As should be apparent, the lesser the effective flow area between the end of the valve guide and the tapered surface 102 the greater will be the restriction to flow therethrough.

Accordingly, each of the valve guides of the invention can easily be axially adjusted in order to attain the degree of valve sensitivity desired or required, as, for example, in those instances where valve blow down is held to close limits relative to relief pressure settings.

Annular chamber 108 (as well as 108a and 108b) and annular chamber 122 (as well as chambers 122a and 122b) functionally define what is often referred to as huddling chambers. However, such huddling chambers as herein disclosed are unlike the prior art in that the open ends of such chambers are located on what might be considered generally as a plane normal to axis of the discharge orifice 106 and at a relative axial position generally coplanar with such discharge orifice. Such configurations of huddling chambers as herein disclosed and claimed have been found to be extremely effective for creating an additional increased force tending to open the valving member immediately upon initial opening movement of the valve member.

As has already been stated, the pressure setting of the valve assemblies of the invention can be made merely by rotation of the nut, as 52, without in any way disturbing the functioning of any other component.

The use of the heli-coil type insert, as shown at 96, provides various benefits. First, valve assemblies of the prior art employed an undercut form of chamber into which the end of the stem was introduced. A suitable clip was then employed to loosely retain such stem end within the undercut chamber.

The employment of a heli-coil type insert eliminates the need of machining such an undercut chamber, which is an expensive machining operation. The invention obviates the necessity of such an undercut chamber by requiring a simple cheaper tapping operation to form threads 84 which will accommodate the heli-coil type insert 96 which serves to retain the end of the stem 58 within the chamber 86.

Another benefit of the heli-coil type insert 96 is its axial adjustability. For example, in all valve assemblies of the type disclosed, it is necessary to provide a degree of lost motion between the end of the stem 58 and valving member 28 in order to insure against the possibility that valving member 28 will accidentally be lifted off its seat when the manually actuated lever 68 is in the position shown in FIG. 1. Accordingly, the use of an adjustable abutment, such as 96, enables the heli-coil type insert 96 to be variably axially positioned with respect to the threaded portion 92 of stem 58 in order to: (a) assure the attainment of the required degree of lost motion therebetween but (b) at the same time assuring that the degree of lost motion is not so great as to preclude the lifting of the valve member 28 by actuation of the lever 68. This, of course, means that manufacturing tolerances for the lever 68, stem 58 and the valving member 28 may, to some extent, be made more liberal and therefore reduce the related manufacturing costs.

Although in the preferred embodiment of the invention: the outer housing 12 and valving member 28 are made of bronze; the valve guide 44 is made of brass; the spring 30, spring cup 62 and lever 68 are made of steel; and the nut 52 is made of cast iron; such components may, of course, be made of any material suitable to the intended use of such valve assemblies.

Further various modifications of the invention are contemplated among which is the provision of an annular resilient seal 162 carried as by the valving member 28 (or any of the other corresponding valving members) within a suitable recess 164 as depicted in FIG. 7. When the valve 28 is in its closed position, the seal 162, which may be of an O-ring configuration, is partially compressed while when the valve 28 is opened, the seal 162 would at least slightly extend beyond the face of the valving member 28.

The embodiment of the invention shown in FIG. 1 is recommended for use as a safety valve for steam heat boilers. The embodiment illustrated in FIG. 2 is recommended for a valve for a process steam boiler for chemical, petroleum or other industrial processing. The embodiment illustrated in FIG. 3 is recommended for a water relief valve for hot water heaters and hot water pressure vessels. Each of these three different applications have different pressure threshold requirements for actuation. For example, safety valves for steam heat boilers usually require an actuation pressure for relief of 15 psi and have no blowdown requirement. Valves for a process steam boiler for chemical, petroleum or other industrial processing may have pressure relief threshold requirements, depending on particular use, of anywhere from 5 to 250 psi, and all usually require a blowdown actuation at 4 percent less than the relief actuation threshold pressure. Water relief valves for hot water heaters and hot water pressure vessels usually have no blowdown requirements but must be water tight with a resilient seating.

Despite the fact that different embodiments of the invention discussed above have different actuation requirements and applications, it can be appreciated from the foregoing description of these embodiments that a substantial number of components of each of these valves are similar. Thus, a substantial elimination of complication and cost in manufacture and maintenance of these valves is achieved.

Although only selected preferred embodiments of the invention have been disclosed and described, it is apparent that various other embodiments and modifications of the invention are possible within the scope of the appended claims.

I claim:

1. A fluid pressure relief valve assembly comprising a valve housing, inlet means formed in said valve housing adapted for communication with a related source of fluid under pressure, chamber means formed within said valve housing, outlet means formed in said valve housing and communicating with said chamber means, said inlet means including discharge orifice means leading to said chamber means, valving means adapted to be effective for at times closing said discharge orifice means so as to terminate communication between said discharge orifice means and said chamber means, first resilient means for normally biasing said valving means to a closed position against said discharge orifice means, said valving means comprising a valving member having a valving surface generally juxtaposed to said discharge orifice means, sleeve-like valve guide means separate from and slidably received by said valve housing for operatively containing and guiding said valving member as said valving member moves with respect to said discharge orifice means, abutment means carried by said valve housing internally thereof for operatively engaging a portion of said sleeve-like valve guide means to thereby preclude further relative axial movement of said sleeve-like valve guide means, second resilient means for normally biasing said sleeve-like valve guide means into operative abutting engagement with said abutment means, an access opening formed in said valve housing, said access opening being so located as to be generally on one side of said chamber means and opposed to said discharge orifice means, said access opening being of a dimension permitting the passage therethrough of said sleeve-like valve guide means, and adjustably positioned closure means situated generally within and operatively engaging said access opening, said closure means being effective to simultaneously adjustably determine a pre-load force in said first and second resilient means in order to thereby resiliently hold said valving member closed against said discharge orifice means until said fluid under pressure attains a predetermined magnitude of pressure and to resiliently hold said sleeve-like valve guide means in operative abutting engagement with said abutment means.

2. A fluid pressure relief valve assembly according to claim 1, wherein said valve housing comprises an internally formed generally frusto-conical housing portion defining a portion of the wall surface of said chamber means and effectively circumscribing said discharge orifice means, said frusto-conical housing portion including a generally tapered annular surface the axis of which is substantially parallel to the axis of said discharge orifice means, and wherein said sleeve-like valve guide means comprises a tubular member open at either end, said tubular member being axially positioned as to have one of said open ends in relatively close proximity to said tapered annular surface as to define therebetween an annular passageway for the flow of said fluid under pressure whenever said valving member has been moved away from said discharge orifice means.

3. A fluid pressure relief valve assembly according to claim 1, including manually actuated means for manually moving said valving member away from said discharge orifice means, said manually actuated means comprising a cam-like lever situated externally of said valve housing and continually resiliently urged by said first resilient means into operative abutting engagement against said closure means, and a valve stem member passing through said closure means and connected at one end to said lever and connected at an other end to said valve member.

4. A fluid pressure relief valve assembly according to claim 1, including manually actuated means for manually moving said valving member away from said discharge orifice means, said manually actuated means comprising a valve stem having a first portion adapted for manual actuation and a second portion operatively connected to said valving member by means of lost motion connecting means, said lost motion connecting means comprising a first threaded portion formed generally at an end of said valve stem, a second threaded portion formed on said valving member, and a threadably positionable abutment member having third and fourth threaded portions thereon, said third threaded portion being adapted for threadable engagement with said second threaded portion formed on said valving member, and said fourth threaded portion being effective for threadably engaging said first threaded portion in order to permit said first threaded portion to be threadably passed through said fourth threaded portion thereby leaving an unthreaded section of said valve stem freely extending axially through said fourth threaded portion, said threadably positionable abutment member being effective for relative axial adjustment through threadable rotation so as to thereby adjustably determine the position at which said first threaded portion will abut thereagainst when said first threaded portion is moved axially thereto and thereby limit the relative movement of said valve stem due to said unthreaded section of said valve stem freely extending through said fourth threaded portion.

5. A fluid pressure relief valve assembly according to claim 1, including diaphragm means having an outer peripheral portion secured to said sleeve-like valve guide means and an inner peripheral portion secured to said valving member.

6. A fluid pressure relief valve assembly according to claim 5, wherein said sleeve-like valve guide means comprises an open-ended tubular member, wherein said valving member is contained generally within said tubular member, and wherein said diaphragm means comprises a rolling diaphragm sealing member, said rolling diaphragm being so positioned as to have the rolling portion thereof generally between said valving member and said tubular member.

7. A fluid pressure relief valve assembly according to claim 1, including an annular resilient seal carried by said valving member, said resilient seal being so positioned as to circumscribe said discharge orifice means whenever said valving member is closed against said discharge orifice means.

8. A fluid pressure relief valve assembly according to claim 1 wherein said valving means comprises an elongated valve stem member loosely connected at one end to said valving member and having an other end extending through said closure means, spring retainer means carried by said stem member and effective for engaging said first spring means so as to have the resilient force of said first spring means transmitted through said spring retainer means and said stem member and finally into said valving member, said spring retainer means being of cup-like configuration including a cup-bottom wall and integrally formed annular side wall terminating in a radially outwardly directed flange for engaging said first spring means, said cup-bottom wall having an aperture formed therein substantially centrally thereof for slidably receiving said valve stem therethrough, and said spring retainer means being so positioned as to have said cup-bottom wall disposed closer to said closure means while said radially outwardly directed flange is disposed closer to said valving member.

* * * * *